(12) United States Patent
Heath

(10) Patent No.: US 6,238,461 B1
(45) Date of Patent: May 29, 2001

(54) NATURAL GAS DEHYDRATOR

(76) Inventor: Rodney T. Heath, 109 W. 31st St., Farmington, NM (US) 87401

(*) Notice: Subject to any disclaimer, the term of this patent is extended or adjusted under 35 U.S.C. 154(b) by 0 days.

(21) Appl. No.: 09/333,115

(22) Filed: Jun. 15, 1999

(51) Int. Cl.[7] .......................... B01D 47/00; B01D 53/26
(52) U.S. Cl. .................. 95/161; 95/163; 95/166; 95/231; 95/165; 95/193; 95/247; 95/266
(58) Field of Search ................ 95/161–163, 166, 95/169, 174–180, 186, 187, 227–231; 96/158, 165, 168, 182–185, 193, 245, 250, 262, 266

(56) References Cited

U.S. PATENT DOCUMENTS

| | | | |
|---|---|---|---|
| 2,225,959 | * 12/1940 | Miller | 95/231 X |
| 2,726,729 | * 12/1955 | Williams | 96/184 X |
| 2,786,543 | * 3/1957 | Hayes et al. | 96/184 |
| 3,254,473 | * 6/1966 | Fryar et al. | 95/180 |
| 3,321,890 | * 5/1967 | Barnhart | 95/231 X |
| 3,347,019 | * 10/1967 | Barnhart | 95/231 X |
| 3,648,434 | * 3/1972 | Gravis, III et al. | 95/231 X |
| 3,659,401 | * 5/1972 | Giammarco | 95/175 |
| 4,162,145 | * 7/1979 | Alleman | 95/174 |
| 4,431,433 | * 2/1984 | Gerlach et al. | 95/231 |
| 4,659,344 | * 4/1987 | Gerlach et al. | 95/231 |
| 4,676,806 | * 6/1987 | Dean et al. | 95/231 X |
| 4,689,053 | * 8/1987 | Heath | 95/231 X |
| 5,084,074 | * 1/1992 | Beer et al. | 95/231 X |
| 5,163,981 | * 11/1992 | Choi | 95/231 X |
| 5,167,675 | * 12/1992 | Rhodes | 95/231 X |
| 5,346,537 | * 9/1994 | Lowell | 95/166 X |
| 5,453,114 | * 9/1995 | Ebeling | 95/166 |
| 5,490,873 | * 2/1996 | Behrens et al. | 95/166 X |
| 5,536,303 | * 7/1996 | Ebeling | 95/166 |
| 5,766,313 | 6/1998 | Heath | 95/161 |
| 6,004,380 | * 12/1999 | Landreau et al. | 95/174 |
| 6,010,674 | * 1/2000 | Miles et al. | 95/231 X |

* cited by examiner

*Primary Examiner*—Robert H. Spitzer
(74) *Attorney, Agent, or Firm*—Joseph J. Kelly; William P. O'Meara; Klaas, Law, O'Meara & Malkin, P.C.

(57) ABSTRACT

A natural gas dehydrator wherein a portion of the wet glycol from the absorber is pumped under pressure as circulating wet glycol which is used as a coolant for effluents removed from a reboiler and a power source for an educator to form a vacuum in a first chamber of a liquid water removal separator apparatus. The cooled effluents, comprising liquid water, liquid hydrocarbons and uncondensed vapors, move in to the first chamber wherein the liquid water is separated therefrom. The liquid hydrocarbons and the uncondensed vapors are removed from the first chamber and move into the eductor wherein they are combined into the circulating wet glycol. The separated liquid water is transferred to a second chamber of the liquid water removal separator apparatus and then removed therefrom. Also, gases from gas emitting level control apparatus in the natural gas dehydrator are collected and fed into the first chamber.

14 Claims, 2 Drawing Sheets

NATURAL GAS DEHYDRATOR

FIELD OF THE INVENTION

This invention relates generally to natural gas dehydrators of the type used to remove water and water vapor from a natural gas stream composed of a mixture of natural gas, liquid hydrocarbons, water and water vapors and is particularly directed to field natural gas dehydrators.

BACKGROUND OF THE INVENTION

An example of such a field natural gas dehydrator is disclosed in U.S. Pat. No. 5,766,313 to Rodney Thomas Health and the disclosure therein is specifically incorporated herein by reference thereto. In general, such systems comprise a separator means for receiving the oil and water liquids from "wet" (water vapor laden) gas; and a water absorber means, which employs a liquid dehydrating agent such as glycol, for removing the water vapor from the wet gas and producing "dry" gas suitable for commercial usage. The glycol is continuously supplied by a pump to the absorber means in a "dry" low-water vapor-pressure condition and is removed from the absorber means in a "wet" high-water vapor-pressure condition. The wet glycol is continuously removed from the absorber means and circulated through a reboiler means, which includes a still column, for removing the absorbed water from the glycol and heating the glycol to provide a new supply of hot dry glycol. Heating of the glycol in the reboiler means is generally accomplished through use of a gas burner mounted in a fire tube. The hot dry glycol from the reboiler means passes through a heat exchanger, where the hot dry glycol transfers some of its heat to incoming wet glycol going to the still column. The dry glycol subsequently passes to a dry glycol storage tank. A glycol passage means is provided to enable passage of wet glycol from the absorber means to the reboiler means and to pump dry glycol from the storage tank to the absorber means.

Besides water, the wet glycol going to the still column of the reboiler of the natural gas dehydrator will contain natural gas and absorbed hydrocarbons. A large part of the natural gas flowing with the wet glycol to the still column is the natural gas required to power the glycol pump. The balance of the natural gas and other hydrocarbons are absorbed or entrained into the glycol during the water-absorption step in the absorber means.

On many dehydrators, a volume of natural gas is intentionally induced into the reboiler in order to dry the wet glycol to a higher concentration than can be accomplished by simply adding heat. The process of intentionally inducing a volume of natural gas into the reboiler is referred to as gas stripping.

In the still column of the reboiler of the natural gas dehydrator, the water, natural gas, and other hydrocarbons are separated from the glycol by the pressure reduction from the absorber pressure to approximately atmospheric pressure in the still column and by the application of heat from the burner in the fire tube of the reboiler.

The water, natural gas, and other hydrocarbons contained in the wet glycol stream which are separated in the still column from the wet glycol will be exhausted into the atmosphere through the atmospheric vent on the still column. The hydrocarbon vapors released through the still column of a natural gas dehydrator are air pollutants. Specifically, certain hydrocarbons such as benzene, toluene, ethylbenzene, and xylene, commonly referred to as BTEX have been proven to be carcinogenic.

The gas dehydrator disclosed in U.S. Pat. No. 5,766,313 offers solutions to the problems discussed above but improvements can be made to such a gas dehydrator.

BRIEF DESCRIPTION OF THE INVENTION

This invention provides a field natural gas dehydrator in which the wet glycol from the absorber is fed into a three phase emissions separator which is provided with suitable apparatus, such as an overflow tank, that collects an amount of the wet glycol, for a purpose described more fully below, and then routes any additional amount of wet glycol to a reboiler. The collected wet glycol is used as a circulating medium to cool the emissions from the still column of a reboiler and to provide the energy for an educator as described more fully below. By using the collected wet glycol as the pump circulating medium, the lubricity, vapor pressure, viscosity, and etc. of the circulating medium remain relatively constant from dehydrator to dehydrator; therefore overcoming potential pump problems which could occur if a circulating medium with changing physical constants, from dehydrator to dehydrator, was used.

Also, the collected wet glycol can be pumped in greater volumes to be used as a heat exchange medium for condensing the effluents from the still column of the reboiler. As explained more fully below, the volume of the collected wet glycol being pumped by the circulating pump is 20 to 30 times greater than the volume of the wet glycol exiting the absorber.

This invention also provides a liquid water removal separator that collects the liquid water condensed from the effluents from the still column so that substantially no liquid water is entered into the emissions separator.

The invention also provides a system for collecting the gases from the level controllers used in the natural gas dehydrator so that the collected gases may be used as fuel for the burner of the reboiler.

In accordance with this invention, a natural gas dehydrator is provided wherein a supply of natural gas is fed into an absorber wherein it is subjected to dry glycol to remove undesirable materials therefrom so that the dry glycol is changed into wet glycol that is removed from the absorber and fed at reduced pressure into a three phase emissions separator apparatus. One part of the three phase emissions separator apparatus has structure for holding a predetermined amount of the wet glycol. The three phase emissions separator apparatus has additional structure for receiving excess wet glycol from the structure. A reboiler apparatus receives the excess wet glycol and changes the excess wet glycol into dry glycol and effluents. A condenser apparatus is provided for receiving the effluents. Circulating apparatus is provided for circulating wet glycol from the structure through the condenser apparatus to change the effluents to at least liquid water, liquid hydrocarbons and uncondensed vapors and returning the circulating wet glycol to the three phase emissions separator apparatus. Liquid water removal separator apparatus is provided for receiving the at least liquid water, liquid hydrocarbons and uncondensed vapors for separating and removing the liquid water. Additional apparatus is provided for removing the liquid hydrocarbons and the uncondensed vapors from the liquid water removal separator apparatus and feeding the liquid hydrocarbons and the uncondensed vapors to the three phase emissions separator apparatus.

The additional apparatus comprises an eductor having an inlet port, an exit port and a vacuum port. A first conduit through which the circulating wet glycol flows is connected to the inlet port. A second conduit extends between the outlet port and the three phase emissions separator apparatus. A third conduit extends between the liquid water removal separator apparatus and the vacuum port to form a vacuum in the liquid water removal separator apparatus.

The liquid water removal separator apparatus comprises a hollow shell having a partition therein for forming at least a first and a second chamber in the hollow shell. A first outlet port is formed in the first chamber and is connected to the third conduit so that a vacuum is formed in the first chamber. A first inlet port is formed in the first chamber so that the at least liquid water, liquid hydrocarbons and uncondensed vapors from the condenser apparatus can flow into the first chamber and be separated into at least an upper layer comprising the uncondensed vapors, a middle layer comprising the liquid hydrocarbons and a lower layer comprising the liquid water. The first outlet port is located so that the uncondensed vapors and the liquid hydrocarbons can flow through the first outlet port into the third conduit. The withdrawn uncondensed vapors and the liquid hydrocarbons enter the eductor and are entrained into the wet glycol and flow with the wet glycol from the eductor to the three phase emissions separator. A second outlet port is formed in the first chamber and a second inlet port is formed in the second chamber. A conduit connects the second outlet port and the second inlet port so that the liquid water can flow from the first chamber into the second chamber. A drain port is formed in the second chamber for draining the liquid water from the second chamber.

The natural gas dehydrator has at least one gas emitting level control apparatus in at least the absorber, the three phase emissions separator apparatus and the liquid water removal separator apparatus. A gas inlet port is formed in the liquid water removal separator apparatus. Collecting apparatus is provided for collecting the gases emitted from the gas emitting level control apparatus and conduits extend between the collecting apparatus and the gas inlet port for transmitting the gases to the gas inlet port.

In the operation of the above-described apparatus a supply of natural gas is fed into an absorber wherein it is subjected to dry glycol to remove undesirable materials therefrom so that the dry glycol is changed into wet glycol that is removed from the absorber and is processed by feeding the wet glycol from the absorber into the three phase emissions separator apparatus; collecting a supply of wet glycol to a predetermined level in the three phase emissions separator apparatus; feeding excess wet glycol greater than the predetermined level from the three phase emissions separator apparatus to a reboiler for changing the excess wet glycol into dry glycol and effluents; feeding the effluents to a condenser apparatus; circulating wet glycol from the supply of wet glycol through the condenser apparatus to change the effluents to at least liquid water, liquid hydrocarbons and uncondensed vapors and returning the circulating wet glycol to the three phase emissions separator apparatus; feeding the at least liquid water, liquid hydrocarbons and uncondensed vapors to a liquid water removal separator apparatus; separating and removing the liquid water from the at least liquid water, liquid hydrocarbons and uncondensed vapors; draining the removed liquid water; and feeding the at least liquid hydrocarbons and the uncondensed vapors to the three phase emissions separator apparatus.

A vacuum is formed in the liquid water removal separator apparatus by positioning an eductor having an inlet port, an outlet port and a vacuum port between the liquid water removal separator apparatus and the three phase emissions separator apparatus; feeding the circulating wet glycol to the inlet port; passing the circulating wet glycol through the eductor and out of the outlet port to create a vacuum; feeding the circulating wet glycol from the outlet port into the three phase emissions separator apparatus; and connecting the vacuum port to the liquid water removal separator apparatus to form a vacuum therein.

The removal of the liquid water is accomplished by forming a first and a second chamber in the liquid water removal separator apparatus; feeding the at least liquid water, liquid hydrocarbons and uncondensed vapors into the first chamber; separating the at least liquid water, the liquid hydrocarbons and uncondensed vapors in the first chamber; removing the liquid hydrocarbons and the uncondensed vapors from the first chamber; entraining the removed uncondensed vapors and liquid hydrocarbon; into the wet glycol in the eductor; transferring at least a portion of the liquid water from the first chamber to the second chamber until the liquid water in the second chamber reaches a predetermined level; and removing at least a portion of the liquid water from the second chamber.

Additional gas is transferred to the first chamber by providing at least one gas emitting level control apparatus in at least the absorber, the three phase emissions separator apparatus and the liquid water removal separator apparatus; collecting the gases emitted by the gas emitting level control apparatus; and feeding the collected gases into the first chamber.

BRIEF DESCRIPTION OF THE DRAWINGS

Preferred embodiments of the invention are illustrated in the drawings in which.

DETAILED DESCRIPTION OF THE INVENTION

Figure 1:
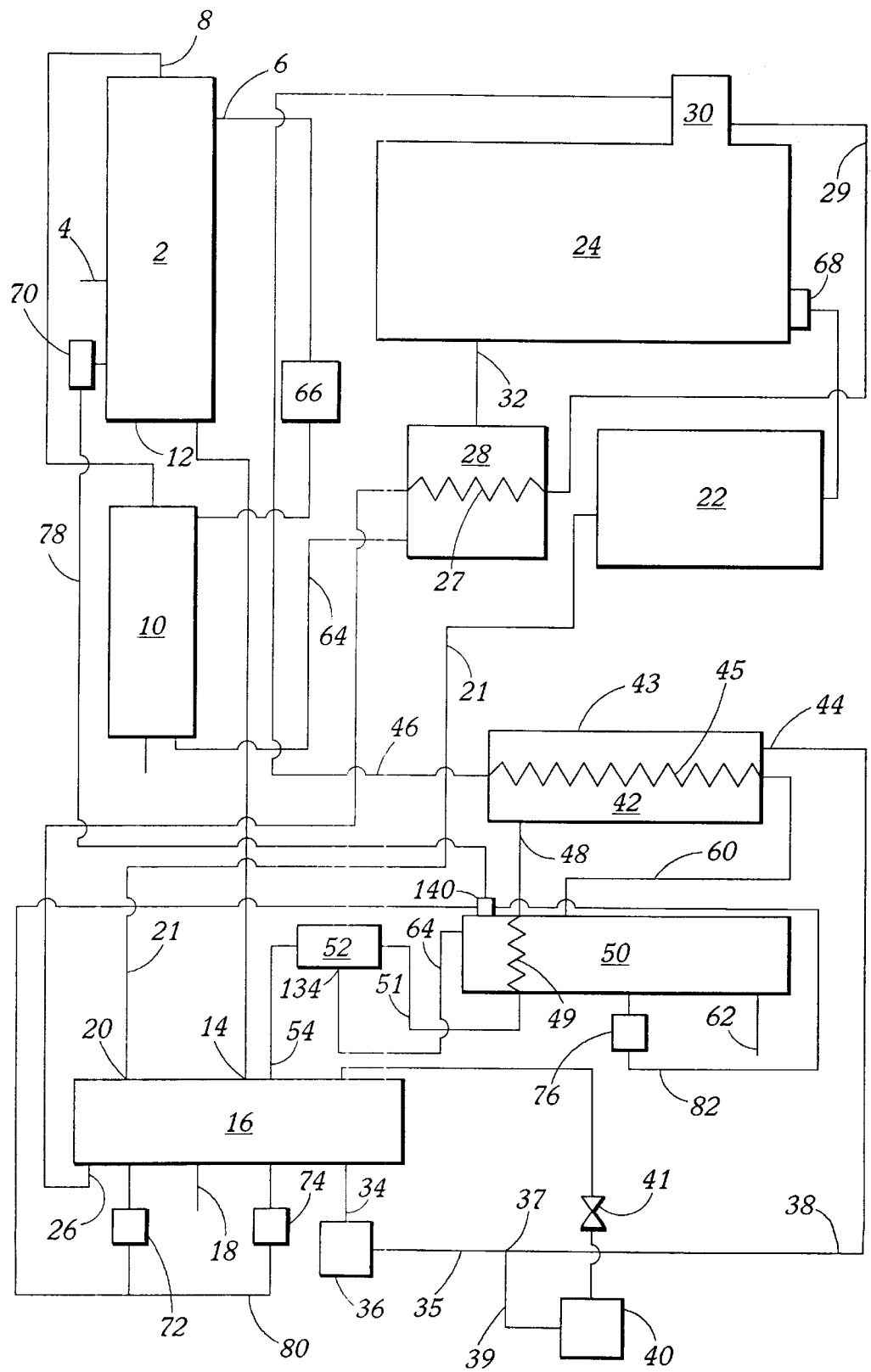
FIG. 1 is a block diagram of the invention.
Figure 2:
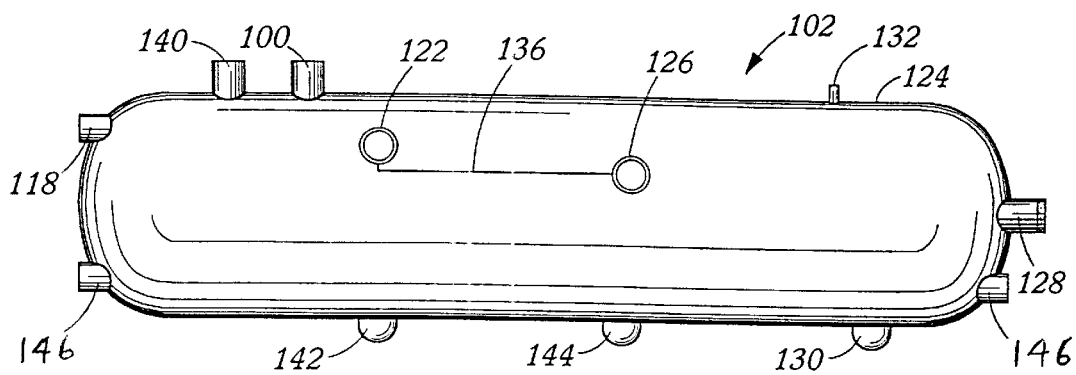
FIG. 2 is a schematic elevational view of the liquid water removal separator apparatus.

This invention is directed toward a field natural gas dehydrator such as the one described in U.S. Pat. No. 5,766,313, the disclosure of which is specifically incorporated herein by reference thereto. The volume and pressure of the natural gas flowing through the system can vary in wide ranges. Each unit is designed by those skilled in the art to perform at wide ranges of volume and pressure of the natural gas being processed and various controls have been associated with the natural gas dehydrators so that these dehydrators can be operated in a conventional manner by those skilled in the art. The operation of the various portions of this invention uses such conventional apparatus that are normally used in the operation of a natural gas dehydrator. In accordance with this invention, the natural gas is first passed through a conventional three phase inlet separator (not shown) to remove water and liquid hydrocarbons therefrom. The natural gas is then fed into an absorber 2 through an inlet 4 so that the natural gas can flow upwardly through the absorber. Dry glycol is introduced through inlet 6 and flows through spaced apart bubble trays (not shown) into the absorber and then downwardly through the absorber. The dry glycol functions primarily to remove water and hydrocarbons from the natural gas and becomes wet glycol. The treated natural gas exits through outlet 8 in the top portion of the absorber 2 and is passed through a glycol-gas heat exchanger 10 and passes out as dry salable natural gas at relatively high pressures, for example 50 PSIG to 1500 PSIG depending on the operating pressures of the pipeline system.

The wet glycol is collected in a wet glycol sump 12 in the bottom portion of the absorber 2 and flows to the inlet port 14 of a conventional three phase emissions separator 16. Free gaseous hydrocarbons contained in the wet glycol will be released in the three phase emissions separator as a result of the reduction of pressure form the pressure of the absorber of between about 50 and 1500 PSIG to the pressure of the three phase emissions separator which is between about 10 and 15 PSIG and preferably about 15 PSIG. This is accomplished by conventional apparatus. Liquid hydrocarbons are separated from the wet glycol in the three phase emissions separator 16 by a weir system and are withdrawn through outlet 18. The wet glycol is collected in one part of the three phase emissions separator 16 to a predetermined level and then the excess wet glycol flows to another part of the three phase emissions separator. The flow of the wet glycol from the absorber to the three phase emissions separator is controlled by the amount of dry glycol required to remove the water vapor from the natural gas being processed. The amount of dry glycol used in the range of 3 to 6 gallons of dry glycol for each pound of water removed.

The freed gaseous hydrocarbons exit through outlet 20 in the top portion of the three phase emissions separator 16 and flow thorough conduit 21 into a system 22 as described in the '313 patent to be used as fuel in a reboiler 24 as described more fully below.

Once the predetermined level of wet glycol has been reached in the three phase emissions separator 16, any additional wet glycol passes from the three phase emissions separator 16 through pipe 26 and then through a rolled coil 27 in the dry glycol storage 28 and then thorough pipe 26 to the still column 30 of the reboiler 24 wherein the wet glycol is changed into dry glycol and fed through line 32 into the dry glycol storage 28. The effluents from the still column, liquid water, liquid hydrocarbons, vaporized water, gases and vaporized hydrocarbons are processed as described more fully below.

Wet glycol is withdrawn from the predetermined level of wet glycol in the three phase emissions separator 16 through outlet 34 and enters a pump 36 which circulates the wet glycol through transmission lines through a particulate filter 38 and a hydrocarbon filter 40 and into an effluent condenser 42. On one of the smallest units the pump circulates the wet glycol at the rate of between about 4 and 6 gallons/min and preferably at about 5 gallons/min and at a pressure of between about 40 and 100 PSIG and preferably at a pressure of about 45 PSIG. On larger units the flow will be large but the pressures will generally remain the same. The effluent condenser 42 comprises a hollow shell 43 having a finned tubing 45 located therein. The effluents from the still column 30 flow through piping 46 and enter into the finned tubing 45. The wet glycol enters at one end 44 of the effluent condenser 42 and flows around the finned tubing 45. The wet glycol functions to cool the effluents in the finned tubing 45. Using the wet glycol circulating as described above greatly increases the cooling efficiency of the effluent condenser. The amount of wet glycol circulating through the condenser system is substantially greater than the amount of wet glycol exiting from the absorber 2 and is about 20 to 30 times greater than the amount of wet glycol exiting from the absorber 2. The wet glycol then flows through outlet 48 of the effluent condenser 42 through suitable piping and flows through a conduit 49 in a liquid water removal separator 50 and through line 51 into the power inlet port of a conventional eductor 52 for creating a vacuum source that forms a vacuum in the liquid water removal separator 50 for purposes described more fully below. The wet glycol flows out of the eductor 52 and is passed into the three phase emissions separator 16 through line 54.

The cooled effluent flows out of the effluent condenser 42 through line 60 and enters the liquid water removal separator 50 wherein water is removed as described below through drain 62. The system for removing the water is discussed more fully below. Hydrocarbon vapors and any unseparated liquid water and liquid hydrocarbons are drawn out of the liquid water removal separator 50 by the vacuum in the eductor 52 through line 64 and enter into the eductor and are entrained into the wet glycol in the eductor and move with the wet glycol into the three phase emissions separator 16 through line 54. The hydrocarbon vapors in the three phase emissions separator 16 flow out thereof as described above, the wet glycol flows into the still column as described above or is used to maintain the wet glycol level in the three phase emissions separator 16. If any liquid hydrocarbon is formed in the three phase emissions separator, it is removed therefrom through outlet 18.

The dry glycol for the absorber 2 is drawing from the dry glycol storage 28 through line 64 and flows through the glycol gas heat exchanger 10 and enters a suitable pump 66 to enter the absorber 2 through inlet 6.

The hydrocarbon vapors leaving the three phase emissions separator are fed into a system 22 wherein the hydrocarbon vapors alone or in conjunction with a supplemental fuel source are used to fire the burner 68 in the reboiler. The wet glycol entering the still column of the reboiler is dried and exits from the reboiler into a dry glycol storage tank through line 32. This system 22 is similar to that disclosed in U.S. Pat. No. 5,766,313.

Figure 3:
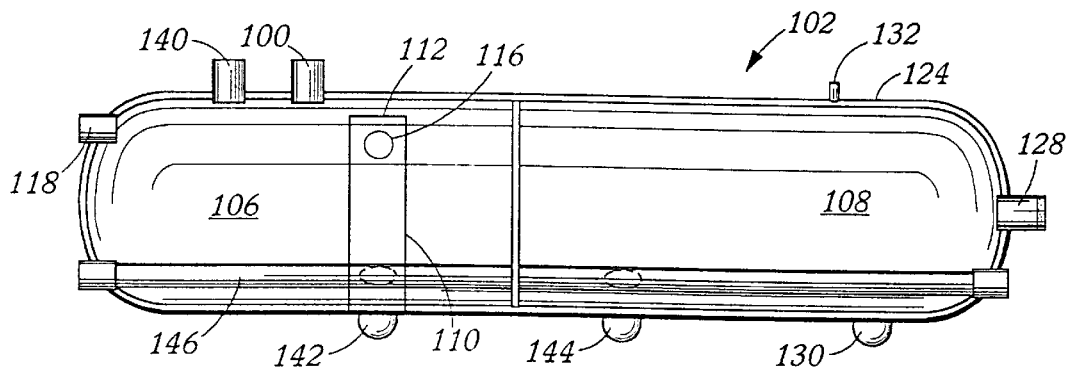
FIG. 3 is a schematic elevational view similar to FIG. 2 with parts removed.
Figure 4:
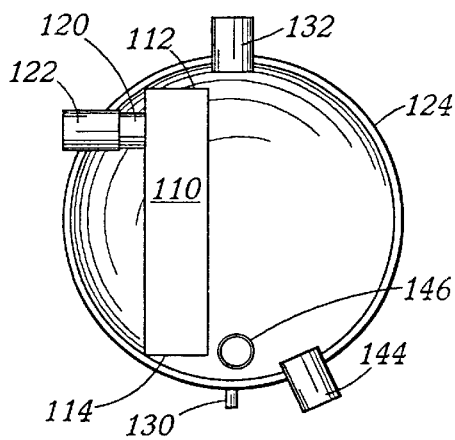
FIG. 4 is a schematic end elevational view of parts of FIG. 3.
Figure 5:
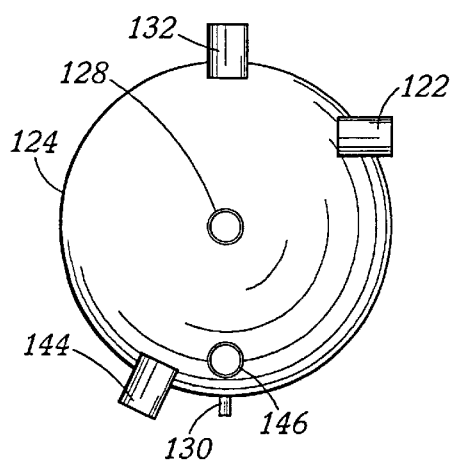
FIG. 5 is a schematic end elevational view taken from the right side of FIG. 2.

The absorber 2 has a level control apparatus 70, the emissions separator has two level controls apparatus 72 and 74 and the liquid water removal separator 50 has a level control apparatus 76. Each of the level control apparatus 70, 72, 74 and 76 emit a gas during operation and are of the type marketed by Wellmack Company under the trade designation liquid level control. The emitted gases are collected from each level control apparatus and are fed through inlet port 140 into the chamber 106 (FIG. 3) of the liquid water removal separator 102. The gas from level control apparatus 70 is fed through conduit 78; the gas from level control apparatus 72 and 74 are fed through conduit 80 and the gas from level control apparatus 76 is fed through conduit 82 to the inlet port 140. Eventually, these gases flow from the three phase emissions separator 16 through conduit 21 to the system 22 to be used as fuel for the burner 68.

The water removing system is illustrated in FIGS. 2–5. The cooling of the effluents in the effluent condenser 42 changes the effluents from water vapor to liquid water and hydrocarbon vapors to liquid hydrocarbons and some uncondensed vapors. The uncondensed vapors, the liquid water and liquid hydrocarbons flow under a slight vacuum in the liquid water removal separator 50 (4 to 6 inches water column) from the effluent condenser 42 through conduit 60 to the inlet 100 of the liquid water removal separator apparatus 102. The liquid water removal separator apparatus 102 lies generally in a horizontal plane and has a generally cylindrical interior and has a sealed baffle 104 to divide the liquid water removal separator apparatus 102 into two chambers 106 and 108. The chamber 106 has a generally vertically extending pipe 110 which is open at the top 112 and bottom 114. The pipe 110 has an open port 116 located below, approximately one inch, the outlet 118 of the liquid water removal separator apparatus 102. Open port 116 is connected by pipe 120 to outlet pipe 122 in the shell 124 of the liquid water removal separator apparatus 102. The chamber 108 has an inlet port 126, a liquid water control connection 128, a liquid water outlet port 130 and a pressure supply port 132.

The effluent from the effluent condenser 42 enters into the chamber 106 which is at the same pressure as leaving the effluent condenser 42. The liquid hydrocarbons, gaseous hydrocarbons, uncondensed water vapor and any unseparated liquid water flow out of the chamber 106 through outlet 118 and through line 64 (FIG. 1) to the vacuum port 134 of the eductor 52 where they are entrained into the wet glycol flowing through the eductor 52. The liquid water and the liquid hydrocarbons contained in the effluent are collected in the chamber 106 and are separated by gravity. The liquid hydrocarbons rise to the top and exit through outlet 118 and flow with the gaseous components to the vacuum port 134 of the eductor 52. The liquid water settles to the bottom and flow sunder the bottom 114 of the pipe 110 and up thorough the pipe 110. The liquid water then flows through pipe 120 to the outlet pipe 122. A conduit 136 (FIG. 2) having a normally open motor valve mounted therein connects outlet pipe 122 to the inlet port 126. The liquid water flows from outlet pipe 122 through conduit 136 and into the chamber 108 through the inlet port 126. The chamber 108 has the same vacuum as the chamber 106. When the water level in the chamber 108 reaches a predetermined high level set point, the level control apparatus (not shown) but inserted through the connection 128 puts out a gas signal to open a water dump valve (not shown) and to close the normally open motor valve in the conduit 136. The gas signal also energizes pressure supply port 132 to pressurize chamber 108 to above atmospheric pressure and cause the liquid water to flow out of the chamber 108 through liquid water outlet port 130. When the liquid water level in the chamber 108 reaches a predetermined low level, the level control apparatus vents off the pressure, opens the motor valve in the conduit 136 and closes the water dump valve. When the motor valve in the conduit 136 opens, the gas under pressure flows through the inlet 126 through the conduit 136 and the outlet pipe 122 and out thorough the top 112 of pipe 110 into the chamber 106 and is withdrawn from the chamber 106 by the vacuum of the eductor 52 so that the vacuum pressure is equalized in the chambers 106 and 108. The liquid water then again begins to flow into the chamber 108. The liquid water removal separator 102 is provided with a drain port 142 for the chamber 106 and a drain port 144 for the chamber 108. Also, heating apparatus 146 is provided in the liquid water removal separator 102.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method wherein a supply of natural gas is fed into an absorber wherein it is subjected to dry glycol to remove undesirable materials therefrom so that the dry glycol is changed into wet glycol that is removed from the absorber comprising:

feeding wet glycol from said absorber into a separator apparatus;

collecting a supply of wet glycol to a predetermined level in said separator apparatus;

feeding excess wet glycol greater than said predetermined level from said separator apparatus to a reboiler for changing said excess wet glycol into dry glycol and effluents;

feeding said effluents to a condenser apparatus;

circulating wet glycol from said supply of wet glycol through said condenser apparatus to change said effluents to at least liquid water, liquid hydrocarbons and uncondensed vapors and returning said circulating wet glycol to said separator apparatus;

feeding said at least liquid water, liquid hydrocarbons and uncondensed vapors to a liquid water removal separator apparatus;

separating said liquid water from said at least liquid water, liquid hydrocarbons and uncondensed vapors; and feeding said at least liquid hydrocarbons and said uncondensed vapors to said separator apparatus.

2. A method as in claim 1 and further comprising:

positioning an eductor having an inlet port, an outlet port and a vacuum port between said liquid water removal separator apparatus and said separator apparatus;

feeding said circulating wet glycol to said inlet port;

passing said circulating wet glycol through said eductor and out of said outlet port to create a vacuum;

feeding said circulating wet glycol from said outlet port into said separator apparatus; and connecting said vacuum port to said liquid water removal separator apparatus to form a vacuum therein.

3. A method as in claim 2 and further comprising:

forming at least a first and a second chamber in said liquid water removal separator apparatus;

feeding said at least liquid water, liquid hydrocarbons and uncondensed vapors into said first chamber;

separating said at least liquid water, said liquid hydrocarbons and uncondensed vapors in said first chamber;

removing said liquid hydrocarbons and said uncondensed vapors from said first chamber and passing said removed liquid hydrocarbons and said uncondensed vapors to said eductor;

transferring at least a portion of said liquid water from said first chamber to said second chamber until said liquid water in said second chamber reaches a predetermined level; and removing at least a portion of said liquid water form said second chamber.

4. A method as in claim 3 and further comprising:

providing at least one gas emitting level control apparatus in at least said absorber, said separator apparatus and said liquid water removal separator apparatus;

continuously collecting said gases emitted by said gas emitting level control apparatus; and feeding said continuously collected gases from said gas emitting level control apparatus into said first chamber.

5. A method as in claim 1 and further comprising:

forming a first and a second chamber in said liquid water removal separator apparatus;

feeding said at least liquid water, liquid hydrocarbons and uncondensed vapors into said first chamber;

separating said at least liquid water, said liquid hydrocarbons and uncondensed vapors in said first chamber;

removing said liquid hydrocarbons and said uncondensed vapors from said first chamber;

transferring at least a portion of said liquid water from said first chamber to said second chamber until said liquid water in said second chamber reaches a predetermined level; and removing at least a portion of said liquid water from said second chamber.

6. A method as in claim 5 and further comprising:

providing at least one gas emitting level control apparatus in at least said absorber, said separator apparatus and said liquid water removal separator apparatus;

continuously collecting said gases emitted by said gas emitting level control apparatus; and feeding said continuously collected gases from said gas emitting level control apparatus into said first chamber.

7. A method as in claim 1 and further comprising:

providing at least one gas emitting level control apparatus in at least said absorber, said separator apparatus and said liquid water removal separator apparatus;

continuously collecting said gases emitted by said gas emitting level control apparatus; and feeding said continuously collected gases from said gas emitting level control apparatus into said first chamber.

8. A natural gas dehydrator wherein a supply of natural gas is fed into an absorber wherein it is subjected to dry glycol to remove undesirable materials therefrom so that the dry glycol is changed into wet glycol that is removed from the absorber comprising:

separator apparatus for receiving said wet glycol from said absorber;

said separator apparatus having structure for holding a predetermined amount of said wet glycol;

said separator apparatus having additional structure for receiving excess wet glycol from said structure;

reboiler apparatus for receiving said excess wet glycol and changing said excess wet glycol into dry glycol and effluents;

condenser apparatus for receiving said effluents;

circulating apparatus for circulating wet glycol from said structure through said condenser apparatus to change said effluents to at least liquid water, liquid hydrocarbons and uncondensed vapors and returning said circulating wet glycol to said separator apparatus;

liquid water removal separator apparatus for receiving said at least liquid water, liquid hydrocarbons and uncondensed vapors and for separating and removing said liquid water; and removing apparatus for removing said liquid hydrocarbons and said uncondensed vapors from said liquid water removal separator apparatus and feeding said liquid hydrocarbons and said uncondensed vapors to said separator apparatus.

9. A natural gas dehydrator as in claim 8 wherein said removing apparatus comprises:

an eductor having an inlet port, an exit port and a vacuum port;

a first conduit through which said circulating wet glycol flows connected to said inlet port;

a second conduit extending between said outlet port and said separator apparatus; and a third conduit extending between said liquid water removal separator apparatus and said vacuum port.

10. A natural gas dehydrator as in claim 9 wherein said liquid water removal separator apparatus comprises:

a hollow shell;

a partition in said hollow shell for forming at least a first and a second chamber in said hollow shell;

a first outlet port in said first chamber;

said third conduit being connected to said first chamber for forming a vacuum therein;

a first inlet port in said first chamber so that said at least liquid water, liquid hydrocarbons and uncondensed vapors can flow into said first chamber and be separated into at least an upper layer comprising said uncondensed vapors, a middle layer comprising said liquid hydrocarbons and a lower layer comprising said liquid water;

said first outlet port being located so that said uncondensed vapors and said liquid hydrocarbons flow through said first outlet port into said third conduit;

a second outlet port in said first chamber;

a second inlet port in said second chamber;

a conduit connecting said second outlet port and said second inlet port so that said liquid water can flow from said first chamber into said second chamber; and a drain port in said second chamber for draining said liquid water form said second chamber.

11. A natural gas dehydrator as in claim 10 and further comprising:

at least one gas emitting level control apparatus in at least said absorber, said separator apparatus and said liquid water removal separator apparatus;

a gas inlet port in said first chamber of said liquid water removal separator apparatus;

collecting apparatus for collecting said gases emitted from said gas emitting level control apparatus; and conduits extending between said collecting apparatus and said gas inlet port for transmitting said gases to said gas inlet port.

12. A natural gas dehydrator as in claim 8 wherein said liquid water removal separator apparatus comprises:

a hollow shell;

a partition in said hollow shell for forming at least a first and a second chamber in said hollow shell;

a first outlet port in said first chamber;

a first inlet port in said first chamber so that said at least liquid water, liquid hydrocarbons and uncondensed vapors can flow into said first chamber and be separated into at least an upper layer comprising said uncondensed vapors, a middle layer comprising said liquid hydrocarbons and a lower layer comprising said liquid water;

said first outlet port being located so that said uncondensed vapors and said liquid hydrocarbons flow through said first outlet port;

a second outlet port in said first chamber;

a second inlet port in said second chamber;

a conduit connecting said second outlet port and said second inlet port so that said liquid water can flow from said first chamber into said second chamber; and a drain port in said second chamber for draining said liquid water from said second chamber.

13. A natural gas dehydrator as in claim 12 and further comprising:

at least one gas emitting level control apparatus in at least said absorber, said separator apparatus and said water separator apparatus;

a gas inlet port in said first chamber;

collecting apparatus for collecting said gases emitted from said gas emitting level control apparatus; and conduits extending between said collecting apparatus and said gas inlet port for transmitting said gases to said gas inlet port.

14. A natural gas dehydrator as in claim 8 and further comprising:

at least one gas emitting level control apparatus in at least said absorber, said separator apparatus and said liquid water removal separator apparatus;

said liquid water removal separator apparatus having at least a first chamber;

a gas inlet port in said first chamber;

collecting apparatus for continuously collecting said gases emitted from said gas emitting level control apparatus; and conduits extending between said collecting apparatus and said gas inlet port for transmitting said continuously collected gases to said gas inlet port.

* * * * *

UNITED STATES PATENT AND TRADEMARK OFFICE
CERTIFICATE OF CORRECTION

PATENT NO. : 6,238,461 B1  
DATED : May 29, 2001  
INVENTOR(S) : Rodney T. Heath Page 1 of 1

It is certified that error appears in the above-identified patent and that said Letters Patent is hereby corrected as shown below:

<u>Column 5,</u>  
Line 53, change "large" to -- larger --.

<u>Column 8,</u>  
Line 48, change "water form" to -- water from --.

<u>Column 10,</u>  
Line 24, change "water form" to -- water from --.

Signed and Sealed this

Twenty-ninth Day of January, 2002

Attest:

JAMES E. ROGAN  
*Attesting Officer*   *Director of the United States Patent and Trademark Office*